(12) United States Patent
Teller et al.

(10) Patent No.: US 6,595,147 B2
(45) Date of Patent: *Jul. 22, 2003

(54) METHOD FOR ADSORBING CONTAMINANTS FROM FLUE GAS

(75) Inventors: Aaron J. Teller, Palm Beach Garden, FL (US); Jonathan R. Lagarenne, Annandale, NJ (US)

(73) Assignee: Hamon Research-Cottrell, Inc., Somerville, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 10/084,463

(22) Filed: Feb. 28, 2002

(65) Prior Publication Data

US 2002/0117094 A1 Aug. 29, 2002

Related U.S. Application Data

(63) Continuation of application No. 09/086,591.

(51) Int. Cl.[7] .............. F23B 7/00; B01D 59/26

(52) U.S. Cl. .............. 110/345; 110/342; 110/346; 110/234; 95/107; 95/134; 95/142; 431/4; 502/418; 502/435; 502/437; 502/516

(58) Field of Search .............. 110/346, 216, 110/203, 234, 233, 341, 342, 344, 345, 347, 165 A, 215, 210, 252, 256; 95/92, 93, 131, 90, 107, 114, 115, 134, 142; 96/108, 373; 431/4; 502/418, 435, 437, 516

(56) References Cited

U.S. PATENT DOCUMENTS

| | | |
|---|---|---|
| 1,751,612 A | 3/1930 | Barnebey et al. |
| 1,810,871 A | 6/1931 | Davis et al. |
| 3,876,393 A | 4/1975 | Kasai et al. |
| 3,886,088 A | 5/1975 | DeJong |
| 4,425,256 A | 1/1984 | Pilipski .............. 502/418 |
| 4,818,505 A | 4/1989 | Muller |
| 4,828,680 A | 5/1989 | Green et al. |
| 4,833,877 A | 5/1989 | Ashland et al. |
| 4,877,534 A | 10/1989 | Nishida et al. |
| 4,886,000 A | 12/1989 | Hölter et al. |
| 4,889,698 A | 12/1989 | Moller et al. |
| 4,977,837 A | 12/1990 | Roos et al. |
| 4,978,477 A | 12/1990 | Larson et al. |
| 5,022,330 A | 6/1991 | Burgher et al. |

(List continued on next page.)

FOREIGN PATENT DOCUMENTS

| | | |
|---|---|---|
| DE | 43 15 359 A1 | 11/1994 |
| DE | 44 41 173 A1 | 5/1996 |
| EP | 0 409 034 A1 | 1/1991 |
| EP | 0 764 457 A2 | 3/1997 |
| JP | 58-124115 | 7/1983 |

(List continued on next page.)

OTHER PUBLICATIONS

"How many uses can ISGS researchers dream up for activated char?", Jul. 1995, GeoNews, pp. 1–5, http://www.isgs.uiuc.edu/isgsroot/news/geonews/july95/act–char.html.*

McConnachie, G.L. et al., "Activated carbon from Moringa husks and pods", 1996, 22nd WEDC Conference, pp. 279–282.*

Phillips, Jonathan, "Creating 'Basic' Carbon Surfaces", 1996, CAER—University of Kentucky, Center for Applied Research, vol. 7, No. 5, Energeia, pp. 1, 4, 5.*

(List continued on next page.)

Primary Examiner—Ljiljana Ciric
(74) Attorney, Agent, or Firm—Howrey Simon Arnold & White, LLP

(57) ABSTRACT

A method and apparatus for controlling or removing mercury, mercury compounds and high molecular weight organics, if present, from a resource recovery exhaust stream by separately adding a carbonaceous char to the flue gas while it is still within the unit. The char can be produced in situ by adding a carbonaceous material and allowing it to thermally decompose.

27 Claims, 1 Drawing Sheet

U.S. PATENT DOCUMENTS

| | | | |
|---|---|---|---|
| 5,159,885 A | 11/1992 | Hasebe et al. | |
| 5,171,552 A | 12/1992 | Miura et al. | |
| 5,172,644 A | 12/1992 | Offen | |
| 5,177,305 A | 1/1993 | Pichat | |
| 5,190,406 A | 3/1993 | Shannonhouse et al. | |
| 5,204,310 A | 4/1993 | Tolles et al. | 502/416 |
| 5,206,207 A | 4/1993 | Tolles | |
| 5,217,505 A | 6/1993 | Maroldo et al. | 502/416 X |
| 5,245,115 A | 9/1993 | Barrillon et al. | 110/345 X |
| 5,260,047 A | 11/1993 | Berger | |
| 5,264,013 A | 11/1993 | Brentrup | 95/134 |
| 5,320,051 A | 6/1994 | Nehls, Jr. | 110/345 |
| 5,405,593 A | 4/1995 | Knudson | 502/41 X |
| 5,405,812 A | 4/1995 | Bruggendick | 502/516 X |
| 5,424,043 A | 6/1995 | Martin et al. | 110/252 |
| 5,505,766 A | 4/1996 | Chang | 95/134 |
| 5,569,436 A | 10/1996 | Lerner | 95/134 X |
| 5,575,982 A | 11/1996 | Reiss et al. | |
| 5,620,506 A | 4/1997 | Ikenaga et al. | |
| 5,630,367 A | 5/1997 | Kobata et al. | 110/234 X |
| 5,672,323 A | 9/1997 | Bhat et al. | |
| 5,685,243 A | 11/1997 | Gohara et al. | 110/345 |
| 5,785,936 A | 7/1998 | Levendis | 110/203 X |
| 5,787,823 A | 8/1998 | Knowles | 110/344 |
| 5,827,352 A | 10/1998 | Altman et al. | |
| 5,883,040 A | 3/1999 | Armstrong et al. | 502/437 |
| 5,895,520 A | 4/1999 | Rolke et al. | 95/132 |
| 5,964,921 A | 10/1999 | Uitvlugt | |
| 5,990,374 A | 11/1999 | Vicard et al. | |
| 6,027,551 A | 2/2000 | Hwang et al. | 95/134 |
| 6,224,839 B1 | 5/2001 | Fan et al. | |
| 6,451,094 B1 * | 9/2002 | Chang et al. | 95/134 X |

FOREIGN PATENT DOCUMENTS

| | | |
|---|---|---|
| JP | 5-220338 | 8/1993 |
| JP | 5-261359 | 10/1993 |
| JP | 10-8118 | 1/1998 |
| JP | 10-57758 | 3/1998 |
| JP | 11-257619 | 9/1999 |
| JP | 2000-239011 | 9/2000 |
| JP | 2000-300947 | 10/2000 |
| TW | 055751 | 1/1984 |
| WO | 99/08777 | 2/1999 |

OTHER PUBLICATIONS

Lizzio, Anthony A. et al., "Interim Final Technical Report: Development of Activated Char for Combined SO2/NOx Removal", Sep. 1, 1996 –Aug. 31, 1997, pp. 1–4.*

Toles, Christopher A. et al., "Activated Carbons for Agricultural Byproducts for Adsorption of Organics and Metals", 1998, CAER—University of Kentucky, Center for Applied Research, vol. 9, No. 3, Energeia, pp. 1–3, 6.*

Suszkiw, Jan, "Some 'Trash–Talk' Worth Listening to—Activated Carbon in a Nutshell", Sep. 1999, Agricultural Research, pp. 14–16.*

Buonicor & Davis (eds.) *Air Pollution Engineering Manual*, Van Nostrand Reinhold, pp. 33 and 413.

Cheremisinoff and Ellerbush, *Carbon Absorption Handbook*, Ann Arbor Science Publishers (1978), p. 285 (Table 8–1).

Hsi et al., "Preparation and Evaluation of Coal–Derived Activated Carbons for Removal of Mercury Vapor from Simulated Coal Combustion Flue Gases", American Chemical Society, Energy & Fuels 1998, vol. 12, Oct. 9, 1998, p.p 1061–1070.

Wu et al., "Interactions between vapor–phase mercury compounds and coal char in synthetic flue gas," Fuel Processing Technology, vol. 63, Issue 2–3, pp. 93–107.

* cited by examiner

METHOD FOR ADSORBING CONTAMINANTS FROM FLUE GAS

CROSS REFERENCE TO RELATED APPLICATIONS

This application is a continuation of U.S. patent application Ser. No. 09/086,591.

BACKGROUND OF THE INVENTION

1. Field of the Invention

The invention relates in general to the removal of contaminants from the waste streams generated in a waste incineration apparatus, particularly municipal solid waste (MSW) incinerator-type waste incineration apparatus and the like, by the use of a char.

2. Description of Related Art

The toxic effects of emissions of mercury, mercury compounds and high molecular weight organic compounds from incinerators operating on municipal, hazardous, or hospital waste has become a matter of increasing environmental concern. Mercury emissions have been limited by regulation to concentrations of between 10 $\mu$g /Nm$^3$ and 100 $\mu$g /Nm$^3$. Because of the volatility of mercury and its compounds formed in the incineration process and the toxic dioxins and furans formed in both the combustion and post combustion stages, their removal is problematic.

Attempts to remove mercury, mercury compounds and high molecular weight organic compounds from incinerator flue gas have been costly where significant efficiency is desired. As such, these toxins sometimes pass through conventional particulate collection devices, for example baghouses and electrostatic precipitators (with actual increase in dioxin concentrations in the electrostatic precipitator) and exit through effluent stacks in impermissibly high concentrations.

It has been known that a bed of activated carbon, in the presence of gaseous hydrogen chlorine, can adsorb and remove mercury vapor from the air passing thereover. Efforts to remove mercury and its compounds from flue gases using carbon have included attempts to enhance the adsorption capacity by pretreatment of the carbon adsorbent with hydrochloric acid gas. This method has generally been unsatisfactory because of the low degree of enhancement. Another approach has been to treat the carbon adsorbent with chloride salts. However this approach has also been, in general, unsatisfactory due to a low degree of enhancement, although Taiwanese Patent No. 055751 discloses a successful impregnated carbon, solid adsorbent.

Other attempts at reducing mercury emissions have included controlling baghouse temperature, providing semi-dry lime scrubbing systems with fabric filter collection, the addition of sodium sulfide to flue gas, and wet chemical scrubbing. U.S. Pat. No. 4,889,698 to Moller et al. describes the use of activated carbon to remove mercury from incinerator flue gases by injecting powdery activated carbon in the flue gas in connection with a spray absorption process. The cooling of the flue gases in the spray adsorption process to 90° C.–180° C. is taught to cause absorption of mercury and noxious polyorganic matter onto the powdery activated carbon.

It has also been known to add a carbonaceous material like coal to waste material being combusted. For instance, U.S. Pat. No. 4,886,000 to Hölter et al. relates to a method of producing a sanitarily storable combustion product formed by the degasification of a mixture of garbage and high volatile coal. The coke-like pyrolysis product can be burned as fuel. U.S. Pat. No. 5,022,330 to Burgher et al. is directed to a garbage burning and melting apparatus wherein coal and garbage are mixed and placed in a blast furnace for burning with intense heat. Filters, e.g., smoke scrubbers, are disposed at the outlet of the furnace to remove various impurities from the flue gases exiting the blast furnace. However, these patents do not mention or relate to mercury removal and intend the complete combustion of the carbonaceous material and thereby avoid char formation.

The prior art methods of mercury removal discussed above all require costly treated carbon and/or additional steps, e.g., spray absorption or degasification to remove impurities. The foregoing demonstrates the need for a relatively simple, economic, efficient and effective method of removing mercury, mercury compounds and high molecular weight organics from solid waste incinerator processes and the like.

SUMMARY OF THE INVENTION

It is an object of the present invention to provide a method for controlling contaminant emissions from a waste incineration apparatus.

It is another object of the invention to reduce contaminants by the use of a char.

One or more of the above objects, as well as other objects of the invention, can be obtained by the present invention, the general method of which comprises separately supplying a carbonaceous char to a flue gas within a waste incineration apparatus at a non-combusting charring zone. The use of the carbonaceous char provides adsorption of one or more of the common contaminants contained in flue gas, if present, and thus insures that the flue gas complies with the targeted contaminant emissions level. One embodiment of the present method comprises burning contaminant-containing waste supplied to a waste incineration apparatus to form (i) ash and (ii) contaminant-containing flue gas, separately supplying carbonaceous char at a non-combusting chaffing zone of the waste incineration apparatus, and adsorbing a contaminant from the flue gas onto the char. In this embodiment, the carbonaceous char can be supplied as such or it can be supplied by introducing a carbonaceous material at the non-combusting chaffing zone to thereby form a char in situ. In either event, the contamination level in the flue gas is reduced.

The present invention is based on the discovery that separately supplying char, produced in situ or added to the waste incineration apparatus, can cheaply, efficiently and effectively remove contaminants such as mercury or its compounds, from flue gas. Unlike some prior art strategies, which targeted the treatment of cooled flue gas after it has left the waste incineration apparatus, as is hereinafter defined, the present invention begins the contaminant removal process while the flue gas is still within the waste incineration apparatus. The char, which can be formed in the waste incineration apparatus or supplied thereto, preferably becomes entrained in the flue gas so that as the flue gas and char proceed through the waste incineration apparatus and into the particulate removal device, the char can continually collect the contaminant(s). Indeed, as long as the char is suspended in the flue gas, or is settled on a surface in contact with the flue gas, contaminant adsorption will continue on downstream of the waste incineration apparatus. This contaminant removal occurs without the need to carry out a post-waste incineration apparatus spray adsorption process. The entrained char can then be removed from the flue gas by the particulate removal device such as a baghouse.

DETAILED DESCRIPTION OF THE INVENTION

Figure 1:
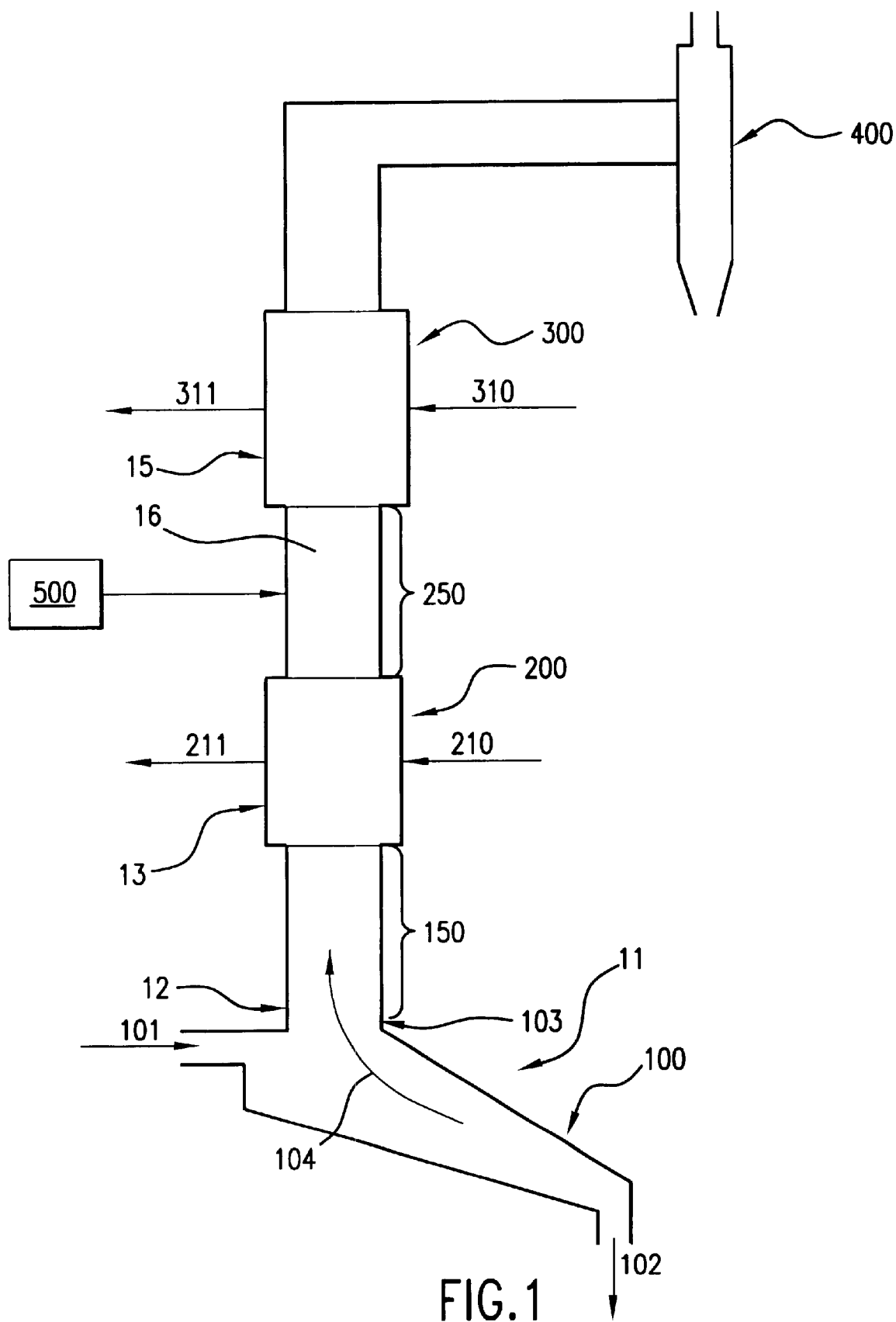
FIG. 1 is a schematic diagram of an apparatus according to the principles of the invention.

The present invention insures reduced emissions of contaminants in flue gas by separately supplying a carbonaceous char to the waste incineration apparatus. The term "separately supplying" means that the carbonaceous material is added to the waste incineration apparatus separately from the waste to be burned. The carbonaceous material can be added as char or it can be turned into char in situ. Thus, carbonaceous char is considered to have been separately supplied so long as the carbonaceous material is added to the waste incineration apparatus separately from the waste to be burned and the material is char or becomes char upon being placed within the waste incineration apparatus.

Once the carbonaceous char is present in the waste incineration apparatus, it serves as a substrate to adsorb various contaminants, if present, from the flue gas. The "contaminants" as used in this invention include mercury, mercury compounds, and high molecular weight organic compounds such as polyaromatics, dioxins, and furans; e.g., polychlorinated biphenyls, chlorodibenzodioxins, and chlorodibenzofurans.

A "waste incineration apparatus" as used herein means an apparatus comprised of at least a combustion zone to which the waste is supplied and burned, and a boiler where the hot flue gases formed from the combustion of the waste are cooled. The boiler is thus a heat exchanger where the flue gas is the hot feed and water or other appropriate fluid is the cold feed. By heat transfer, the flue gas is cooled and the water is heated, typically into steam (i.e., it boils) although a phase change is not necessarily required. The waste incineration apparatus can additionally include intermediate heat exchangers, conventionally known as de-superheaters, between the combustion zone and the boiler to provide partial cooling of the flue gas and to recover the heat energy therefrom. The de-superheaters typically produces high pressure super heated steam from the water feed supplied thereto. One or more de-superheaters can be disposed between the combustion zone and the boiler. The boiler constitutes the end of the "waste incineration apparatus" in that once the flue gas exists the boiler it has exited the waste incineration apparatus for purposes of this invention. However, the flue gas can be and typically is subjected to one or more post treatment devices such as for removing solid particulates, i.e., a baghouse, before being released into the atmosphere.

More specifically, the combustion zone is generally operated at a temperature of from about 700° F. to 2000° F., more typically from about 1700° F. to about 2000° F., depending on the nature of the waste to be burned. Waste can be virtually anything, including the components usually encountered in municipal waste, medical waste, and hazardous waste. The temperature can vary within the combustion chamber such that a temperature gradient is formed. For example, as waste proceeds further into the combustion chamber, typically being carried on a metal grill conveyor, the temperature increases. The combusted waste material leaves the metal grill by the resulting ash falling down and the combustion gases flowing up and out of the combustion zone toward the de-superheater, if present, and the boiler. Materials requiring more heat energy to fully combust are thus carried into ever hotter temperature regions until finally all of the waste has been fully combusted into ash and gas. Oxygen such as in the form of air is usually supplied to the combustion chamber to aid complete combustion. Typically the oxygen is supplied from the underside of the metal grill as so-called "under fire air" in order to also help cool the grill and prevent melting thereof. In other embodiments, oxygen is provided from the top side of the grill ("over fire air") or on both the top and bottom sides of the grill, as are well known in the art.

The flue gases are cooled in the de-superheaters to temperatures generally in the range of about 1100° F. to 1600° F., although the temperatures can be outside of this range depending on the number of de-superheaters employed. Typically with one de-superheater the flue gas will be cooled to within the range of about 1200° F. to 1400° F. The flue gases are then finally cooled in the boiler to a temperature typically within the range of 250° F. to 500° F.

The carbonaceous material (char or otherwise) is added to the waste incineration apparatus at a "non-combusting charring zone," which means a location within the waste incineration apparatus where the carbonaceous material will not be fully combusted as it passes through the remainder of the waste incineration apparatus. In the case where the char is generated in situ, the conditions of the non-combusting chaffing zone are sufficient to char the separately supplied carbonaceous material. In the case where the char is directly added, the conditions are such that combustion is not completed and a char residue, even if somewhat modified, remains. For clarity, the non-combusting chaffing zone can not be at a location where downstream conditions in the waste incineration apparatus will cause complete combustion. For example, while a combustion zone pre-heater may have a sufficiently low temperature to effect chaffing, it can not serve as a non-combusting chaffing zone because the subsequent conditions in the combustion zone would produce complete combustion. So long as the above conditions are met, any area within the waste incineration apparatus can be the non-combusting chaffing zone.

Partial/inefficient combustion conditions useful to cause charring are normally insufficient temperature and/or insufficient oxygen content whereby thermal decomposition is favored. Accordingly, a non-combusting charring zone will typically have an $O_2$ content of not more than 18% (v/v) and a temperature of from about 700° F. to about 2000° F., preferably from about 900° F. to about 1700° F., and more preferably from about 1200° F. to about 1500° F. Such conditions are usually found after the combustion zone since the oxygen content of the flue gas leaving the combustion zone will be depleted due to the combustion reaction. Further, the temperature of the flue gas drops as it proceeds further away from the combustion zone. Accordingly, the superheater(s), the boiler, and the conduits connecting the combustion zone to the boiler via the optional superheater(s) are generally all suitable chaffing zones.

It is also possible to have a chaffing zone within the combustion chamber itself. For example, the conditions near the flue gas exhaust port may be sufficiently low in temperature and oxygen content so as to (1) allow thermal decomposition of any carbonaceous material added thereto and (2) prevent complete combustion of any carbonaceous material added thereto. Indeed, if no over fire air is supplied, then virtually the entire space above the combustion material in the combustion zone is oxygen deficient. If over fire air is used, the care must be taken in placing the charring zone in the combustion zone so as to insure an oxygen depleted atmosphere. In some embodiments, the physical configuration of the combustion zone can be modified, such as by adding a partial wall, so as to facilitate/enhance thermal and oxygen isolation of the flue gas to thereby form a non combusting charring zone. Alternatively, a charring zone can be created by injecting the carbonaceous material as a slurry into an oxygen depleted area of the combustion zone. At the point of injection, the liquid present volatilizes, thus enshrouding the carbonaceous material in a low oxygen environment and providing a degree of thermal insulation from the heat of the combustion zone. The liquid is conveniently water although other volatizing liquids can be used. The amount of liquid in the slurry and flow rate can be adjusted so as to insure sufficient non-combustion and char formation. The point of injection into the combustion zone must be selected so that the carbonaceous char is not subsequently fully combusted in the combustion zone.

A "carbonaceous char" is a carbonaceous material that has been improperly (inefficiently) combusted such that at most 98%, and typically no more than 90%, of the carbonaceous material has been completely combusted. The resulting carbonaceous residue (char) has a porous, discontinuous surface with voids/holes typically having a greatest diameter of 100 angstroms or less. The carbonaceous char is normally finely divided, having an average particle size of 10,000 microns or less, preferably 5,000 microns or less and most preferably from 1 to 2000 microns. If in situ char formation is to be practiced, then the particle size of the carbonaceous material supplied may be larger than the final char particle size as some shrinkage normally occurs during the chaffing process. Generally a non-charred carbonaceous material supplied to the waste incineration apparatus can have a particle size of 50,000 microns or less, preferably 10,000 microns or less, and most preferably 10 to 2000 microns.

The carbonaceous char used in the present invention can be from any carbonaceous material. For example, coal, coal char, coal waste, wood, wood waste, wood char, cellulosic waste, plastic waste, and fly ash from an incompletely combusted fuel, and pure carbon can all be used in the present invention. It is preferred that the carbonaceous source (material or char) is free of contaminants such as dioxins or other toxic substances subject to emission limits. A preferred carbonaceous source, from the standpoint of economics, is saw dust, which may contain chlorine.

As previously mentioned, activated carbon, with its high surface area, has been known to be a good adsorbent for mercury when in the presence of gaseous hydrogen chloride. Conventional wisdom held that the degree of adsorption was related to the available surface area; to wit, the greater the surface area, the greater the adsorption. The use of activated carbon, the word "activated" implying high surface area, was thus targeted for use in the prior art processes. However, the present invention is based in part on the discovery that char, having as little as one tenth the surface area or less of activated carbon, is nonetheless quite effective in adsorbing contaminants such as mercury. Indeed, adsorption tests have now shown that char produced from the thermal decomposition of coal, coal char, coal waste, wood, wood waste, wood char, cellulosic waste, plastic waste and fly ash that contains about 20 percent unburned carbon approaches the mercury adsorption rates achieved by activated carbon. This discovery is important from an economic perspective because char is much less expensive than activated carbon.

It should be noted that merely modifying the combustion zone conditions so as to produce char from the waste material or carbonaceous material added thereto would not achieve the superior results of the present invention. Specifically, in order to encourage the formation of char from the waste combustion, the combustion conditions would have to be less than ideal which would result in an increase in the level of hydrocarbon and carbon monoxide emissions. In contrast, the present invention utilizes the advantages of char by separately adding the char (or its precursor) to the waste incineration apparatus at a non-combusting charring zone. Thus, the efficiency of the combustion in the combustion zone can be maintained in the present invention and the corresponding increase in hydrocarbon and carbon monoxide emissions is avoided while simultaneously reducing toxic levels in the flue gas.

The presence of HCl aids in the removal of mercury and mercury compounds. The adsorption of the hydrogen chloride by the carbon and carbon-containing materials modifies the surface characteristics of the carbon that causes the toxic contaminants to adsorb to the surface of the char. In a preferred embodiment, the present invention reduces mercury, mercury compound, and high molecular weight organic compound emissions from incineration processes that emit hydrogen chloride or have hydrochloric acid added to the gas stream. In the case of municipal, medical and hazardous waste incineration, hydrogen chloride is usually present in the waste stream and thus need not be added.

The reactivity and amount of char used in the present invention can be controlled by the type of carbon-containing material utilized and it s particle size as is well known in the art, as well as by the location of the non-combustion chaffing zone. Generally, the earlier the char is provided to the waste incineration apparatus, the longer the flue gas contact time and hence the greater the adsorption potential. However, the adsorption of a particular toxic substance may have a temperature window where adsorption is favored. For example, above 1600° F. the reaction kinetics may favor desorption. In the case or mercury and mercury compounds, adsorption onto char will generally occur in the temperature window of 200° F. to 700° F., preferably 200° F. to 450° F., which generally corresponds to temperatures in the boiler and downstream therefrom. Providing the char at a non-combusting chaffing zone above this window, even though providing a longer contact time, will not necessarily increase the adsorption efficiency. Note that other benefits may be obtained, however, by supplying the char at such a higher temperature; e.g. fully forming a char in situ from a carbonaceous material.

The carbonaceous material may be supplied in the form of a dry powdered or granular material, with or without a non-toxic carrier gas, or in the form of a slurry. The char can be supplied continuously or batch-wise and in one or more non-combusting charring zones. If the carbonaceous material is not a char, then upon entering the non-combusting charring zone of the waste incineration apparatus, the carbonaceous material will be thermally decomposed to form a carbonaceous char. Once the carbonaceous material is supplied, it is preferably entrained in the flue gas and carried along in intimate contact therewith through the remainder of the waste incineration apparatus and out to the particulate removal device. Note that the in situ char formation can be completed while the carbonaceous material is entrained in the flue gas and has left the immediate vicinity of the non-combusting charring zone. Once char formation has been sufficiently started, the entrained char can begin immediately to adsorb the toxic contaminants, if any. Alternatively, some of the char may remain substantially in the vicinity of its introduction at the non-combusting charring zone and adsorb the toxic contaminants from the flue gas as it passes thereover. Given the longer contact time and potentially significantly greater contact area, however, the entrainment of the char is preferred. Such entrainment can be facilitated by controlling the particle size of the char and/or its carbonaceous material precursor.

The invention will now be described with reference to FIG. 1, which is a diagrammatic representation of one embodiment of the present invention. A waste incineration apparatus is comprised of a combustion zone 100, a de-superheater 200 and a boiler 300. The combustion zone 100 is connected at exhaust port 103 to de-superheater 200 via conduit 150. Similarly, de-superheater 200 is connected to boiler 300 via conduit 250.

The combustion zone 100 comprises an input port 101 where waste to be burned is supplied to the combustion zone and ash outlet 102 for removing the solids remaining after combustion. As the waste is conveyed downwardly by means not shown toward ash outlet 102, the temperatures encountered increase from around 1700° F. at the inlet 101 to about 1850° F. just before outlet 102. During the migration of the solid waste toward outlet 102, gases are released as the solid waste is combusted. These gases, referred to as flue gas, travel out exhaust port 103 in the direction indicated by arrow 104.

The flue gas travels through conduit 150 and into de-superheater 200. Water 210 is supplied to the de-superheater and, via heat transfer with the flue gas, turned into high pressure, super heated steam 211. The internal piping of the de-superheater is not shown but is conventional in the art and is normally arranged in counter current fashion. Upon exiting the de-superheater 200, the flue gas has a reduced temperature of about 1300° F.

The partially cooled flue gas continues through conduit 250 into the boiler 300. Cold water 310 is supplied to the boiler and heated by the flue gas to produce steam 311. The flue gas is correspondingly cooled to a temperature of about 300° F. Again, the internal piping of the heat exchanger system in the boiler is not shown but is conventional as is controlling the amount of water flow to produce a desired quantity and temperature of steam given the amount and temperature of the flue gas.

The cooled flue gas exits the waste incineration apparatus and is conducted into the emission control system that contains a baghouse 400 for particle removal. In practice, the emission control system would typically contain other emission control units, not shown. Once the particles are removed and collected, the gas is released into the atmosphere.

Saw dust injector 500 provides for injection of saw dust at a charring zone 16. The injection can be accomplished mechanically such as by a multiple port auger(s) or equivalent mechanical feeder that distributes the saw dust over essentially the entire cross section of gas flow, or by pressure such as entrainment in a gas stream and blowing into the flue gas with effective distribution. The entraining gas may be inert such as carbon dioxide or nitrogen, or air with reduced oxygen content. The latter can be achieved in a variety of ways including by pre-partial combustion of air, by dilution of air with an inert gas, or by simply using diverted flue gas. In any case the oxygen content of the entraining-injection gas must have a maximum oxygen content equal to or less than that present in the flue gas passing through the charring zone. The saw dust, because of its tendency to experience a decrease in particle size during the charring process, should be in the size of 10 to 2000 microns, as compared with injection of char in the size range of 10 to 1000 microns.

After entering the conduit 250 at the location shown, the saw dust is charred by the relatively hot and oxygen-poor flue gas and is entrained therein. The thus produced char continues to travel with the flue gas through boiler 300 and into baghouse 400 where it is removed from the gas. Along the flow path, the char adsorbs any mercury, mercury compound or high molecular weight organic compound that is present in the flue gas.

The injection point of saw dust corresponds to the charring zone. For clarity, other possible charring zones include the site 11 in the combustion zone 100, site 12 in conduit 150, site 13 in superheater 200, and site 15 in boiler 300.

The invention will now be further illustrated by the following non-limiting example.

EXAMPLE 1

To demonstrate the surprisingly high efficiency of using char for contaminant adsorption, the mercury adsorption efficiencies of a variety of substrates are tested at 350° F., and the conditions and results thereof are set forth in Table 1.

TABLE I

Adsorption of Mercury at 350° F.
Dynamic System

| Sorbent | Wt. Ratio Sorbent/Mercury | Inlet Hg mg/Nm$^3$ | Inlet HCl PPM (dry vol.) | Percent Removal of Mercury | Surface Area m$^2$/g |
|---|---|---|---|---|---|
| Activated Carbon | 725 | 0.21 | 0 | 76.7 | 1000 |
|  | 750 | 0.03 | 102 | 96.6 |  |
|  | 1901 | 0.04 | 0 | 94.6 |  |
| Wood Char | 706 | 0.38 | 433 | 52.7 | 100 |
|  | 2065 | 0.07 | 450 | 92.1 |  |
| Fly ash (20% Char) | 7245 | 0.29 | 0 | 68.4 | 13.8 |
|  | 8323 | 0.18 | 450 | 80.1 |  |
| Fly ash (Char Removed) | 9136 | 0.61 | 450 | 33.4 | 13.8 |
| Black Mesa Coal | 3792 | 0.32 | 432 | 63.6 | 7.6 |
| Utah Coal | 3751 | 0.32 | 450 | 61.4 | 1.6 |

Notably, wood char achieves mercury reduction on the order of activated carbon despite the fact that activated carbon has a surface area ten times that of wood char. Black mesa coal and coal char also show significant mercury reduction. As noted in Table 1, the presence of hydrochloric acid in the gas stream further improves mercury recovery.

Thus, a more economic alternative to the use of activated carbon downstream of the waste incineration apparatus, is the supplying of a char in the waste incineration apparatus. Thermal decomposition processing of a carbonaceous material offers a unique method for introducing carbon into the flue gas, achieving similar or improved contaminant capture efficiencies as the prior art methods.

The invention having been thus described it will be obvious that the same may be varied in many ways without departing from the spirit and scope thereof. All such modifications are intended to be included within the scope of the invention which is defined by the following claims.

We claim:

1. A method for controlling emission from a waste incineration apparatus comprising a combustion zone, a heat recovery zone, and a pollution control system, wherein a temperature range and oxygen content of said heat recovery zone provides a charring zone, comprising the steps of:

supplying waste material to the combustion zone in which the waste material is combusted, combustion of the waste material forming ash and contaminant-containing flue gases, separately supplying a carbonaceous material to the contaminant-containing flue gases at the charring zone, wherein said carbonaceous material is selected from the group consisting of coal, coal waste, wood, wood waste, cellulose, cellulosic waste, plastic, plastic waste and mixtures thereof, wherein said carbonaceous material is charred to produce a char within the chaffing zone, and said char becomes entrained in the contaminant-containing flue gases so that said char and said flue gases proceed through the heat recovery zone and pollution control system together, and said carbonaceous char adsorbs the contaminants from said flue gases.

2. The method of claim 1, wherein the pollution control system comprises a solids collector.

3. The method of claim 2, wherein said solids collector is a baghouse filter.

4. The method of claim 1, wherein the charring zone has a temperature in the range of 700° F. to 2000° F.

5. The method of claim 4, wherein the charring zone has a temperature in the range of 900° F. to 1700° F.

6. The method of claim 5, wherein the charring zone has a temperature in the range of 1200° F. to 1500° F.

7. The method of claim 4, wherein the charring zone has an oxygen ($O_2$) content of less than 18% by volume.

8. The method of claim 7, wherein the charring zone is in a region including a superheater and a boiler.

9. The method of claim 1, wherein said contaminant is selected from the group consisting of mercury, mercury compounds, and high molecular weight organic compounds.

10. The method of claim 9, further comprising the step of removing said char from the flue gases after the flue gases have passed through said heat recovery zone, and before said flue gases have left said waste incineration apparatus.

11. The method of claim 1, wherein said carbonaceous material is supplied as a slurry to the charring zone of said waste incineration apparatus.

12. The method of claim 1, wherein the charring zone is in a region including a superheater and a boiler.

13. The method according to claim 12, wherein the charring zone is before the boiler.

14. The method according to claim 13, wherein the charring zone is within the superheater.

15. A method for controlling emission from a waste incineration apparatus comprising a combustion zone, a heat recovery zone, and a pollution control system, wherein a temperature range and oxygen content of said heat recovery zone provides a chaffing zone, comprising the steps of:

supplying waste material to the combustion zone in which the waste material is combusted, the combusting of the waste material forming ash and contaminant-containing flue gases, separately supplying coal char or wood char to the contaminant-containing flue gases at the chaffing zone, wherein said coal char or wood char becomes entrained in the contaminant-containing flue gases so that said coal char or wood char and said flue gases proceed through the heat recovery zone and pollution control system together, and said coal char or wood char adsorbs the contaminants from said flue gases.

16. The method of claim 15, wherein the pollution control system comprises a solids collector.

17. The method of claim 16, wherein said solids collector is a baghouse filter.

18. The method of claim 15, wherein the chaffing zone has a temperature in a range of 700° F. to 2000° F.

19. The method of claim 18, wherein the chaffing zone has a temperature in a range of 900° F. to 1700° F.

20. The method of claim 19, wherein the chaffing zone has a temperature in a range of 1200° F. to 1500° F.

21. The method of claim 18, wherein the charring zone has a molecular oxygen content of less than 18% by volume.

22. The method of claim 21, wherein the charring zone is in a region including a superheater and a boiler.

23. The method of claim 15, wherein said contaminant is selected from the group consisting of mercury, mercury compounds, and high molecular weight organic compounds.

24. The method of claim 23, further comprising the step of removing said char from the flue gases after the flue gases have passed through said heat recovery zone, and before said flue gases have left said waste incineration apparatus.

25. The method of claim 15, the charring zone is in a region including a superheater and a boiler.

26. The method according to claim 25, wherein the charring zone is upstream of said boiler.

27. The method according to claim 26, wherein the charring zone is within said superheater.

* * * * *